United States Patent [19]

Wu

[11] Patent Number: 4,829,797

[45] Date of Patent: May 16, 1989

[54] STEERING WHEEL LOCK

[76] Inventor: Wen Y. Wu, 12F-3, NO192, Chung Cheng 2nd Road, Kaonsiung, Taiwan

[21] Appl. No.: 55,048

[22] Filed: May 28, 1987

[51] Int. Cl.4 .............................................. E05B 13/10
[52] U.S. Cl. ........................................ 70/209; 70/211; 70/226; 70/237
[58] Field of Search .......................... 70/192, 198–206, 70/226, 237, 238, 246, 247, 209, 211; 180/287

[56] References Cited

U.S. PATENT DOCUMENTS

| | | | |
|---|---|---|---|
| 1,142,845 | 6/1915 | Rothenbucher | 70/202 |
| 1,150,999 | 8/1915 | Corley | 70/202 X |
| 1,165,352 | 12/1915 | Whiteside | 70/202 |
| 1,193,679 | 8/1916 | Fox | 70/238 X |
| 1,216,660 | 2/1917 | Conway | 70/226 |
| 1,218,540 | 3/1917 | Fell | 70/226 |
| 1,270,690 | 6/1918 | Burger | 70/226 X |
| 1,340,051 | 5/1920 | Jackson | 70/202 |
| 1,348,891 | 8/1920 | Nixon | 70/202 |
| 1,386,414 | 8/1921 | Lawrence | 70/226 X |
| 1,448,658 | 3/1923 | Furber | 70/226 X |
| 3,245,239 | 4/1966 | Zaidener | 70/238 X |
| 3,348,391 | 10/1967 | Barnwell | 70/211 |
| 3,435,646 | 4/1969 | Michnoff | 70/238 X |
| 3,462,982 | 8/1969 | Moore | 70/209 |
| 3,508,424 | 4/1970 | Eisenman | 70/202 |
| 3,550,409 | 12/1970 | Pariser | 70/238 X |
| 3,719,063 | 3/1973 | Fouces et al. | 70/202 |
| 3,828,593 | 8/1974 | Bolton | 70/209 |
| 3,855,825 | 12/1974 | Pickard | 70/226 X |
| 3,898,823 | 8/1975 | Ludeman | 70/238 X |
| 3,990,280 | 11/1976 | Jahn | 70/238 |
| 4,164,131 | 8/1979 | Desmond et al. | 70/226 X |
| 4,696,172 | 9/1987 | Farrow | 70/202 X |
| 4,699,238 | 10/1987 | Tamir | 70/238 X |
| 4,750,341 | 6/1988 | Laguna | 70/226 X |

FOREIGN PATENT DOCUMENTS

| | | | |
|---|---|---|---|
| 631708 | 6/1936 | Fed. Rep. of Germany | 70/209 |
| 395781 | 1/1966 | Switzerland | 70/192 |

Primary Examiner—Robert L. Wolfe
Assistant Examiner—Suzanne L. Dino
Attorney, Agent, or Firm—Kirschstein, Kirschstein, Ottinger & Israel

[57] ABSTRACT

This automotive steering wheel lock is made up of a rod and a cartridge connected with the rod. The cartridge consists of an upper half cartridge and a lower half cartridge that capture hold of the steering wheel between them and are locked with a lock cylinder and a lock base set separately in the two half cartridges when said half cartridges are closed together. To open the lock, a key is inserted and turned in the keyhole of the lock cylinder. The bottom of the rod can be blocked by the driver's seat or something inside the car or by a thief's body making it difficult to handle the steering wheel, even if the steering wheel should be turned around with the lock locked in an attempt to steal the car.

4 Claims, 4 Drawing Sheets

STEERING WHEEL LOCK

BACKGROUND OF THE INVENTION

A known steering wheel lock for protecting a car from theft is shaped like a stick adjustable in its length and able to hook the brake or the accelerator pedal at one end and the steering wheel at the other end so that the steering wheel cannot be turned around. However, in practical use this kind of lock lacks convenience in handling and storage. Another known lock is put on the steering wheel with two pieces of hooks adjustable in length for preventing the steering wheel from turning around, but the following has defects and inconveniences;

1. When it is to be locked, its length has to be lengthened at first by pulling a rod out before locking by a key; when it is taken down from the steering wheel after unlocking, its rod should be pushed in and its length shortened before putting the lock away. Hence, the second lock is as troublesome as the first kind of conventional lock.

2. Its cost is rather high, its process complicated, its dimension large and its weight heavy in manufacturing.

3. Its handling in locking is not so simple and takes time because the hook pulled out must be held manually on the steering wheel before locking is to be effected by pulling out the key.

4. The two-piece design decreases its structural strength and cannot effectively shorten its length.

SUMMARY OF THE INVENTION

Therefore, the inventor has worked out this new kind of steering wheel lock, trying to attain the following objectives.

1. Ease in locking by pressing down on the steering wheel to prevent it from turning.

2. Simplicity in its structure for easy, quick handling and excellent effectiveness in preventing a car from theft.

3. Convenience in use, locked by pressing down and unlocked by inserting the key.

DETAILED DESCRIPTION OF THE PREFERRED EMBODIMENT

Figure 1:
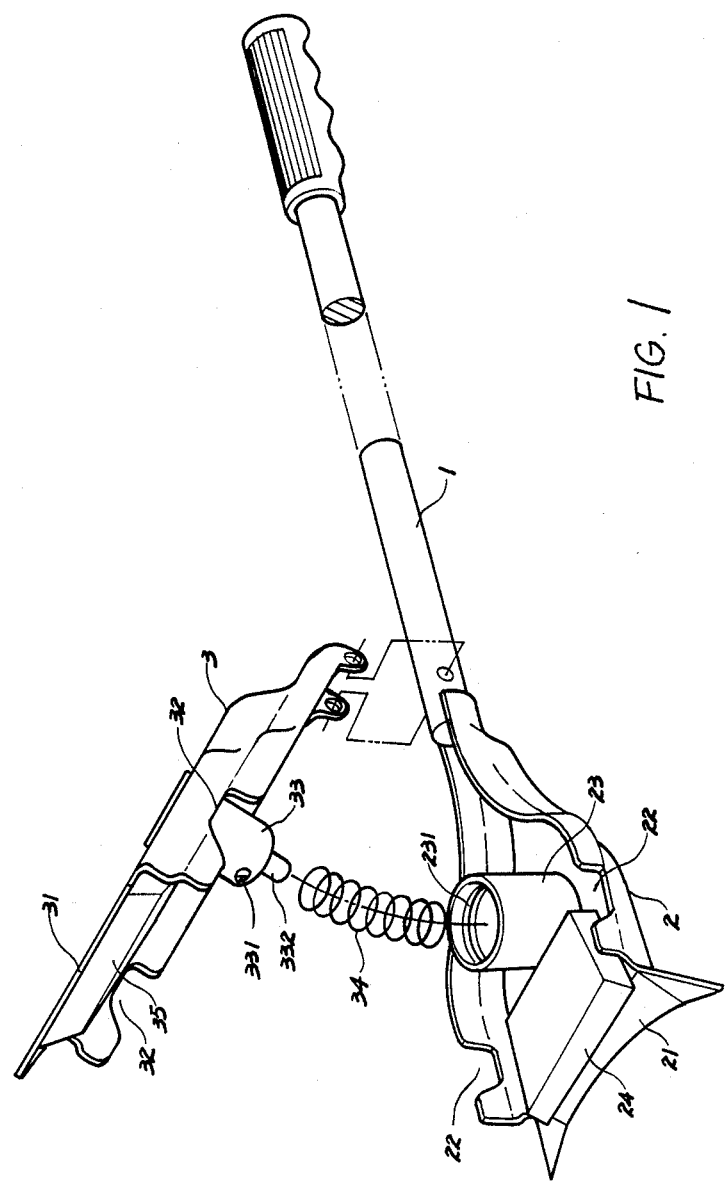
FIG. 1 is an exploded perspective of the steering wheel lock in this invention.

As FIG. 1 shows, this lock is made up of rod 1 and a cartridge having lower 2 and upper 3 half cartridges. The cartridge can be opened by lifting upper half cartridge 3, and is connected to the top end of rod 1.

Lower half cartridge 2 is solidly welded with the top end of rod 1, and arch-shaped plate 21 protruding downward is set at the front edge of lower half cartridge 2. Arch-shaped plate 21 is to touch the underside of steering wheel central frame 41. Hollow lock base 23 is set inside lower half cartridge 2 for lock cylinder 33 set inside upper half cartridge 3 to lock in, by means of ring groove 231 set around the inside wall of lock base 23 to be locked in by dead bolt 331 of lock cylinder 33.

In addition, lower half cartridge 2 has notches 22 at both its sides for the steering wheel to rest on.

Upper half cartridge 3 is loosely riveted at its end with the top end of rod 1 so that lower half cartridge 2 and upper half cartridge 3 may make up a whole cartridge that can be opened or closed, with upper half cartridge 3 able to be lifted up or down with the rivet as a pivot. At the front edge of upper half cartridge 3 is set face plate 31 which has a corresponding location against arch-shaped plate 21 of lower half cartridge 2; face plate 31 can rest on the upper surface of steering wheel central frame 41, which can, in other words, be captured between face plate 31 and arch-shaped plate 21. Upper cartridge 3 is also equipped with notches 32 facing just against notches 22 of lower half cartridge 2 in order to lock the steering wheel immovable when upper and lower half cartridges 2, 3 are shut together, with arch-shaped plate 21 and face plate 31 capturing therebetween steering wheel central frame 41 between and with notches 22, 32 capturing therebetween the circular body of steering wheel 4.

Lock cylinder 33 is set in upper half cartridge 3 for locking in lock base 23 set in lower half cartridge 2 when those half cartridges 2, 3 are shut together; lock cylinder 33 has dead bolt 331 that automatically inserts in ring groove 231 of lock base 23 when both half cartridges 2,3 are closed together, and thus this lock can be locked up. In case this lock is to be unlocked, pushing and turning the key in the keyhole of lock cylinder 33 can open this lock. In order to secure the opening action, short post 332 is set at the bottom of lock cylinder 33, keeping coil spring 34 in lock base 23 so that upper half cartridge 3 may be pushed up at the moment this lock is unlocked by the key.

Moreover, soft cushions 24,35 are placed inside upper and lower half cartridge 2, 3 to prevent the steering wheel from wearing down.

Figure 2:
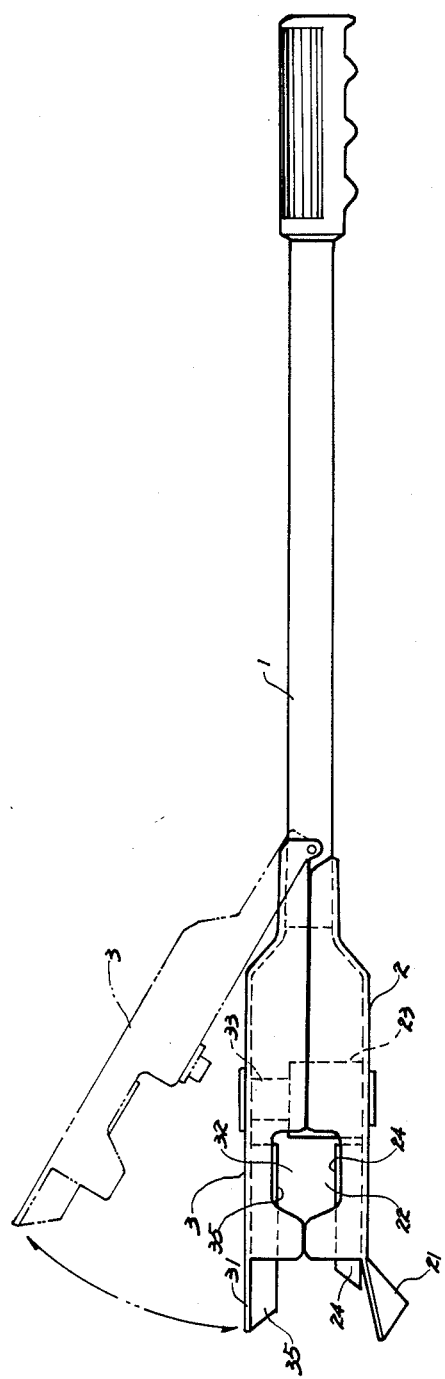
FIG. 2 is a view of this lock locked and to be unlocked in this invention.
Figure 3:
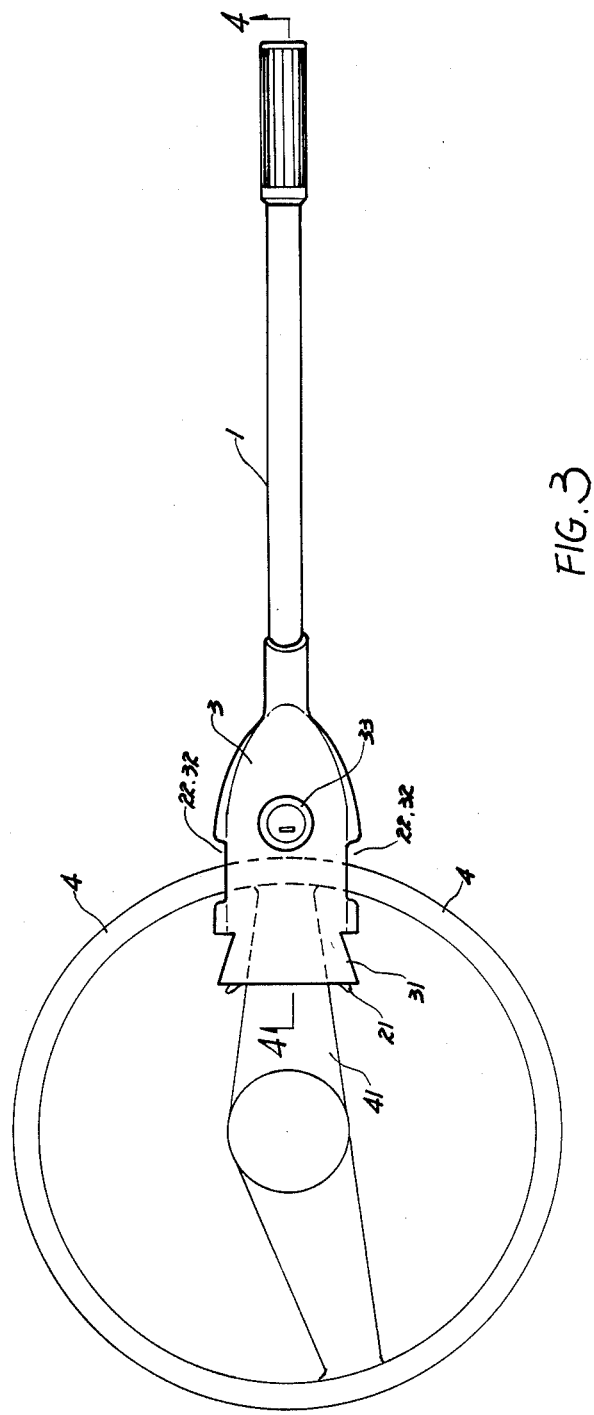
FIG. 3 is a view of this lock practically used on a steering wheel in this invention.
Figure 4:
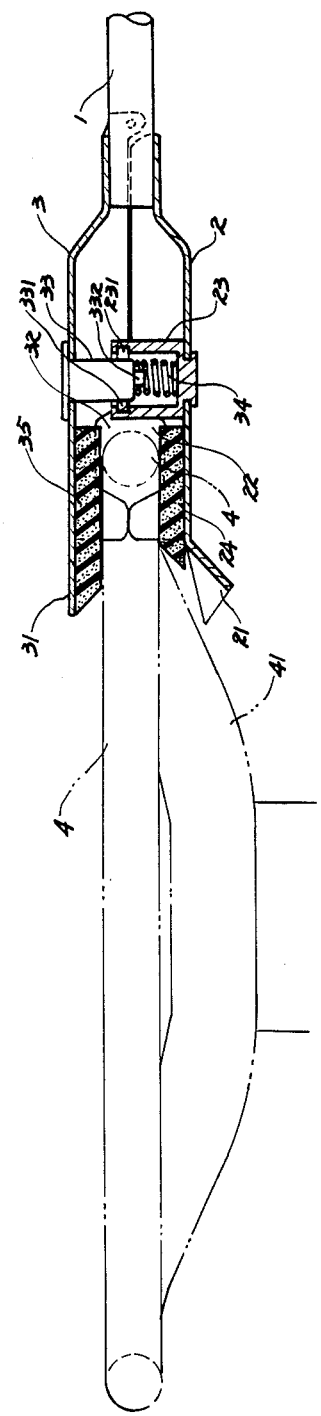
FIG. 4 is a cross-sectional view taken on line 4—4 of FIG. 3.

Now, the way to practically use this lock is to be described with reference to FIGS. 2-4. First, place upper half cartridge 3 over steering wheel 4 together with steering wheel central frame 41 and lower half cartridge 2 under steering wheel 4 with its central frame 41. Next, press down upper half cartridge 3, thereby inserting lock cylinder 33 in lock base 23 and locking the lock. The steering wheel 4 has been caught hold of by this lock. Car theft is avoided, because the bottom of rod 1 is blocked by the driver's seat, or something inside the car, or even by a thief's body, thereby making the steering wheel quite difficult to handle, if a thief wants to turn around the steering wheel with this lock locked trying to drive the car away. If this lock is needed to be taken off the steering wheel for driving the car, inserting and turning the key in the keyhole pulls dead bolt 331 inward off ring groove 231 and upper half cartridge 3 is pushed up by coil spring 34. Then upper and lower half cartridges 2, 3 are opened wide enough to be taken off the steering wheel.

In general, this steering wheel lock, as can be realized in the above-mentioned description, has not only a solid, simple structure, but also a simple operational method in handling.

I claim:

1. A locking attachment for a steering wheel of an automobile having a passenger compartment, comprising:
    (a) an elongated rod having opposite end regions and extending into the passenger compartment;

(b) a housing having one housing portion stationarily secured and welded to one end region of the rod, and another housing portion pivotably mounted on the rod by a pin extending through said one end region of the rod, for pivoting movement relative to said one housing portion between a clamped position in which the housing portions capture therebetween opposite surfaces of a steering wheel, and an unclamped position in which the housing portions are remote from the opposite wheel surfaces to permit removal of the housing and the rod from the steering wheel, each housing portion having a generally planar base wall and side walls extending generally perpendicular to a respective base wall, said base and side walls of each housing portion bounding an interior in which a portion of the steering wheel is received, and each side wall of each housing portion having cutouts through which part of the steering wheel passes into the interior of the respective housing portion;

(c) lock means on the housing portions for locking the housing portions in the clamped position, and for unlocking the housing portions from the clamped position;

(d) biasing means for constantly urging the housing portions to the unclamped position upon unlocking of the lock means; and (e) cushioning means for protecting the opposite wheel surfaces from wear, including a pair of cushions each mounted on a respective housing portion, said cushions facing each other and respectively engaging the opposite wheel surfaces in the clamped position.

2. The attachment of claim 1, wherein the lock means includes a hollow lock tube mounted on the base wall of said one housing portion, said lock tube having an interior annular groove; and wherein the lock means further includes a key-operated cylinder mounted on the base wall of said other housing portion, said cylinder having a bolt extendable in locking engagement with the groove during locking and retractable out of engagement with the groove during unlocking; and wherein the biasing means is a coil spring interposed between the cylinder and the lock tube.

3. The attachment of claim 1, wherein each cushion is a soft pad mounted on each base wall.

4. The attachment of claim 1; and further comprising a hand grip mounted at the opposite end region of the rod.

* * * * *